(No Model.) 4 Sheets—Sheet 1.

S. J. SHIMER.
MACHINE FOR MAKING WASHERS.

No. 392,886. Patented Nov. 13, 1888.

WITNESSES.
F. L. Ourand
Wm. H. Bates

INVENTOR.
Saml J. Shimer
by A. G. Heylmun
Attorney.

(No Model.) 4 Sheets—Sheet 2.

S. J. SHIMER.
MACHINE FOR MAKING WASHERS.

No. 392,886. Patented Nov. 13, 1888.

WITNESSES
F. L. Ourand
Wm H. Bates

INVENTOR,
Saml. J. Shimer,
by A. G. Hufman
Attorney, (No Model.)  4 Sheets—Sheet 3.
S. J. SHIMER.
MACHINE FOR MAKING WASHERS.
No. 392,886.  Patented Nov. 13, 1888.
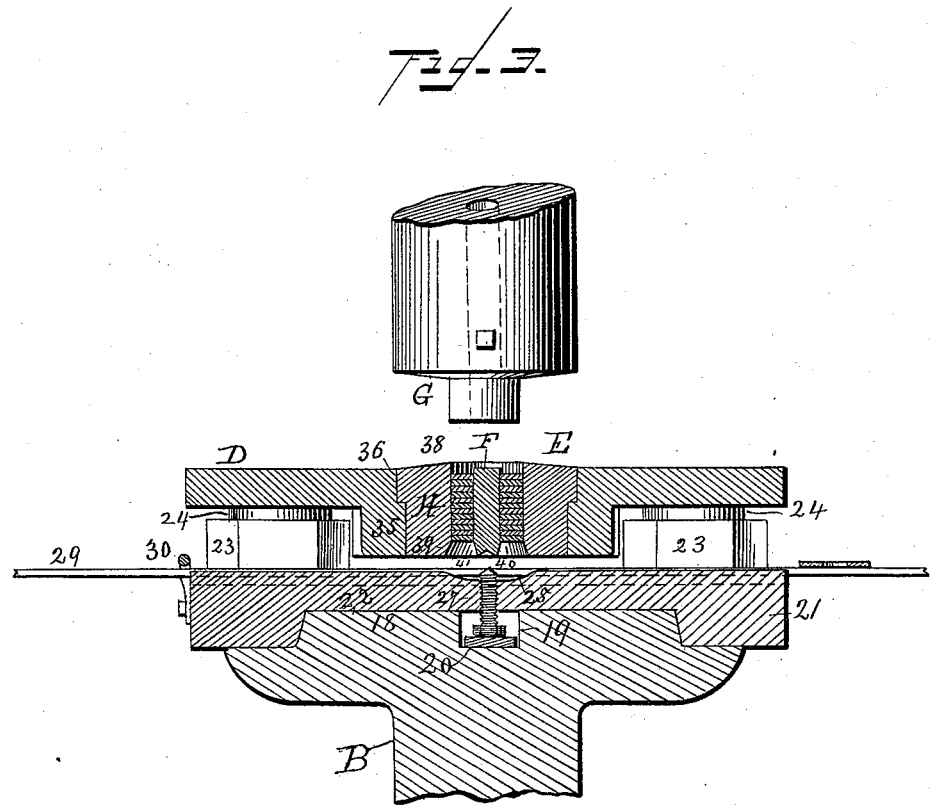
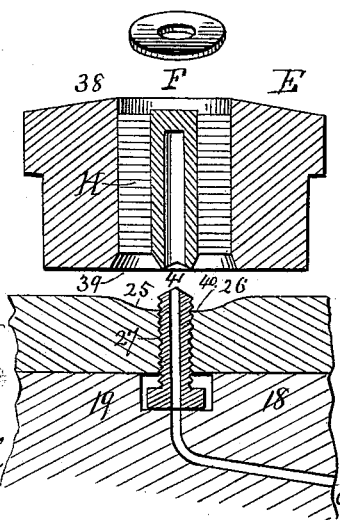
WITNESSES.  INVENTOR.

(No Model.) 4 Sheets—Sheet 4.
S. J. SHIMER.
MACHINE FOR MAKING WASHERS.
No. 392,886. Patented Nov. 13, 1888.
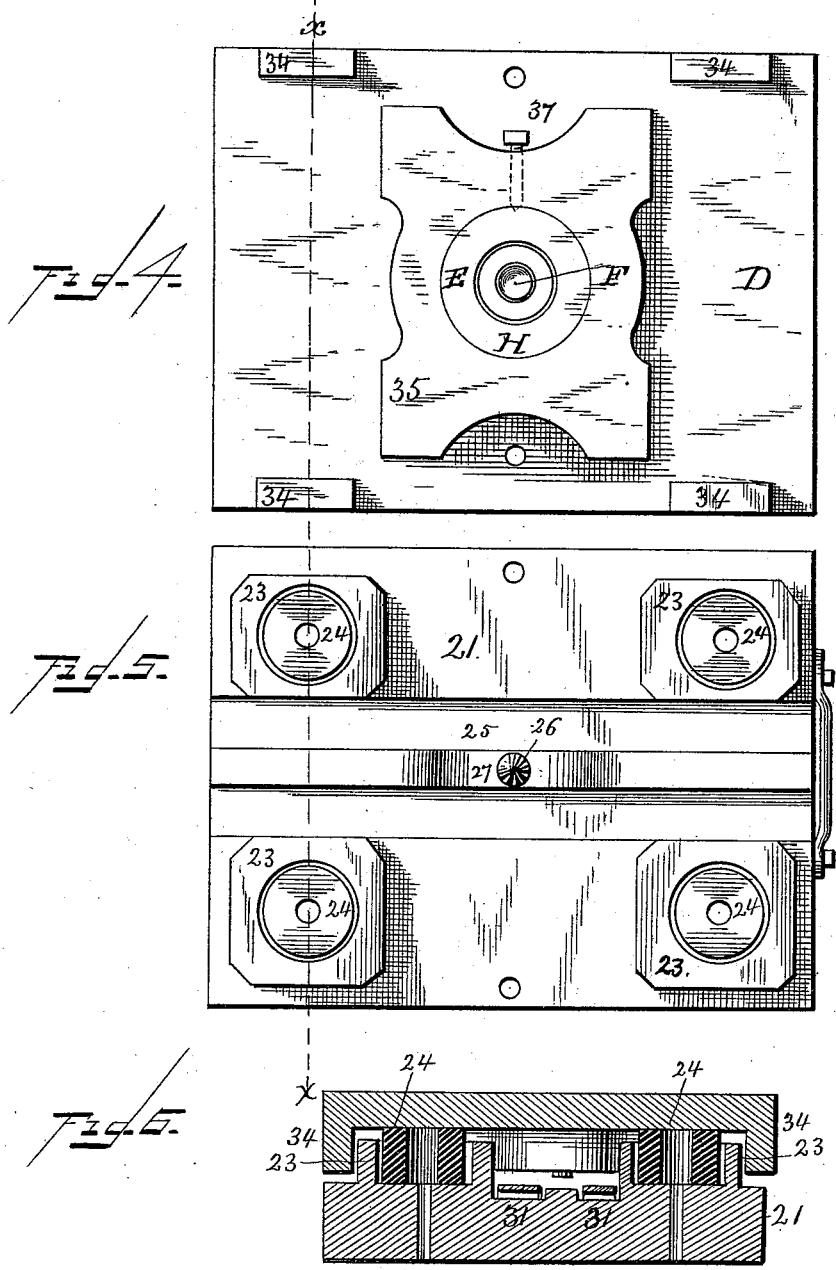

UNITED STATES PATENT OFFICE.

SAMUEL J. SHIMER, OF MILTON, PENNSYLVANIA.

MACHINE FOR MAKING WASHERS.

SPECIFICATION forming part of Letters Patent No. 392,886, dated November 13, 1888.

Application filed August 31, 1888. Serial No. 284,251. (No model.)

*To all whom it may concern:*

Be it known that I, SAMUEL J. SHIMER, a citizen of the United States of America, residing at Milton, in the county of Northumberland, in the State of Pennsylvania, have invented a new and useful Machine for Making Metal Washers, of which the following is a specification.

My invention has relation to improvements in mechanism for making metal washers; and the object is to improve and simplify existing mechanisms now used for that purpose by utilizing, in combination with the punching mechanism, a detachable and removable center punch, whereby, in connection with a series of cut or punched washers, the center punch serves the dual purpose of a centering-pin and a punch, as hereinafter will be fully specified, and specially as the same is particularly pointed out and distinctly claimed.

I attain the purposes of my invention by the means hereinafter described, and which are fully and clearly illustrated in the accompanying drawings, wherein—

Figure 1:
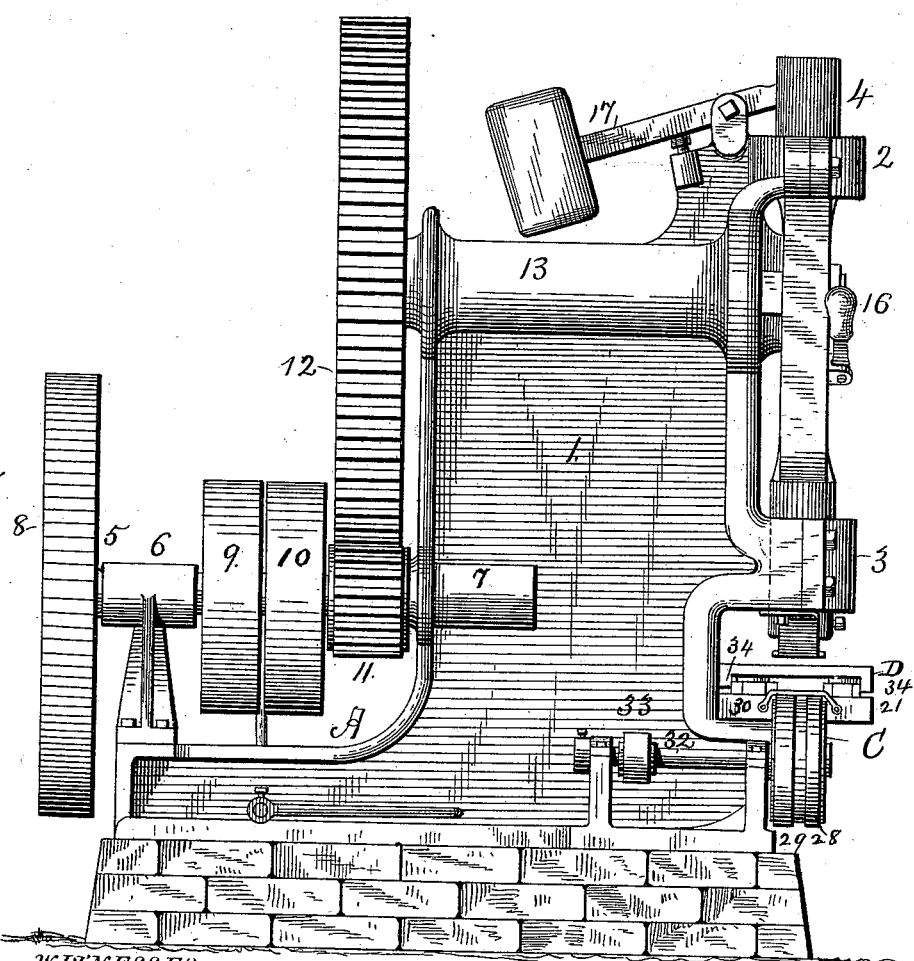
Figure 2:
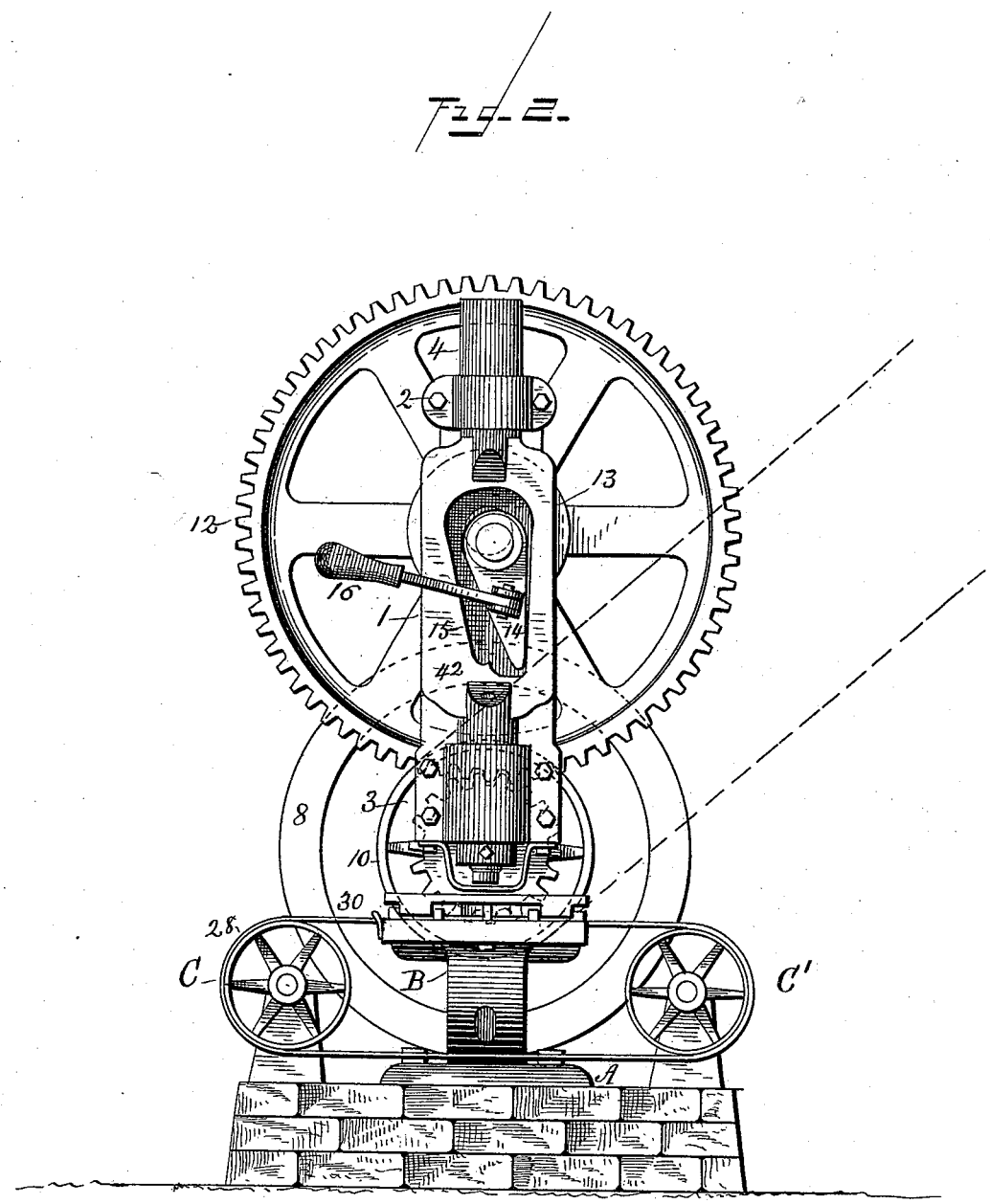

Figure 1 is a side view, in elevation, of my improvements in connection with a punching-machine. Fig. 2 is a front view, in elevation, of the same shown in Fig. 1. Fig. 3 is a central transverse sectional view of the die-bed and the supporting-bed, showing the washers held in the die by the centering-punch, with the cutting-punch in position above. Fig. 4 is a bottom plan view of the die-bed. Fig. 5 is a top plan view of the supporting-bed. Fig. 6 is a sectional view taken on the line $x$ $x$ of Figs. 4 and 5, showing the parts in operative relation. Fig. 7 is a detail view of the centering-punch and adjustable centering-pin, the latter being shown with a central channel through which to admit a cooling-liquid. A washer removed from the center punch is shown in connection with this figure of the drawings.

Reference being had to the drawings, A designates the bed of the machine, having projected therefrom a standard, 1, constituting the support in which is mounted the operative mechanism that reciprocates the cutting-punch. On the front of the standard 1 are formed boxes 2 3, in which is arranged the spindle 4 of the cutting-punch.

The operative mechanism consists of a driving-shaft, 5, mounted in bearings 6 7 on the frame and carrying a balance-wheel, 8, a fast pulley, 9, constituting the driving-pulley, a loose pulley, 10, and small gear-wheel 11, which meshes with the large gear-wheel 12, mounted on a shaft having its bearings in a sleeve, 13, on the top of the standard 1. On the projecting end of the shaft carrying the large gear-wheel is formed an eccentric having loosely mounted thereon a wedge-cam, 14, which operates in the opening 15 of the punch-spindle, and by means of the handle or lever 16 the punch may be thrown in and out of motion. A weighted lever, 17, lifts the punch-spindle, when the wedge-cam is thrown into the enlarged side of the opening in the spindle.

The foregoing description is given generally and without special detail, as the general construction of the machine shown is well and generally known, and forms no part of my invention, I having for convenience adapted my improvements to a mechanism in general use. From this it will be observed that my invention may be used in connection, generally, with any reciprocating punch-spindle and a frame adapted to receive the die bed or support.

Proceeding to describe specifically my improvements in connection with the drawings, B designates the stationary or fixed support, having a raised central portion, 18, formed with central pit or countersink, 19, in which is an elastic cushion, 20. On this support B is mounted a bed-piece, 21, having its central portion cut out, as at 22, to fit over the raised part of the support and adapted to rest with its outer parts on the edges or broad flanges of the support, substantially as shown in Fig. 3 of the drawings. On the upper face of the bed-piece 21 are formed guide-pieces 23, which are chambered out to constitute seats for the elastic cushion or springs 24. The outer walls of the guide-pieces 23 are made square and smooth to serve as guides for the die-bed mounted thereon. The central portion of the bed-piece is countersunk, as at 25, to provide clearance-space between the center punch and the adjustable centering-pin. In the center of the bed-piece is an aperture, 26, in which is adjustably fitted a pin, 27, having convex upper end to engage in the concave lower end of the center punch, as indicated in Fig. 3 of the drawings.

C C' designate two belt-pulleys mounted in bearings on standards projected from the bed of the machine, and on these pulleys are arranged parallel belts 28 29, the upper line of which is substantially on a line with the upper face of the bed-piece and are arranged with a space between their inner edges to travel clear of the center punch, which moves up and down in the space between them. These belts constitute the means for carrying the washers from under the punch as they are dropped therefrom. A belt-keeper, 30, is arranged on the edge of the bed-piece, under which the belts travel, and by which they are kept steady and prevented from throwing the washers off before they reach the place of delivery. To keep the belts separated and parallel, grooves or ways 31 may be formed in the bed-piece. Motion may be communicated to the belt mechanism by extending one of the shafts of the pulleys, as at 32, and fixing a pulley, 33, on the extension, by which a belt may be arranged and placed on a suitable pulley on the line-shaft of the shop; or gearing may be substituted for the belt and pulley and by suitable gearing connected with the driving-shaft of the punch mechanism. These connections are not shown, because in the first instance they are apparent and in the latter they are of such common construction as to be at once suggested.

D designates the die-bed. This consists of a substantial metal plate formed with downward-projecting guide flanges or pieces 34, the inner faces of which register with and set against the outer side faces of the cushion-seats on the bed-piece. The center of the die-bed is thickened or re-enforced, as at 35, and the side faces of the part adjacent to the cushion-seats of the bed-piece bear against the inner sides of the latter. Thus the die-bed is furnished with guiding means in its relation to the bed-piece. In the center of the die-bed is the die-seat 36, which is stepped, as shown, to provide a secure seat for the die. In this die-seat is arranged the die E, having an exterior to fit the seat prepared for it. The die-seat may be secured in its position by means of a setting-bolt, 37, let through the die-bed, as shown.

The aperture in the die E corresponds to the exterior dimensions of the washer or nut to be cut, and is vertical for the greater part of its way through the metal, as at 38, with the lower part flared, or of greater diameter, as at 39, in order that when a washer is forced down the bore to the flared section or part it will be freely and promptly discharged.

F designates the center punch. This consists of a metal pin of the size of the center hole of the washer. It has a plane upper or cutting end, and at the lower end is tapered off, as at 40, to leave the washers fall off when they reach that position in the die-chamber. The lower face end of the center punch is countersunk, as at 41, which strikes down on the point of the centering-pin in the bed-piece, and at every strike or movement eventuates in centering that end of the center punch.

G designates the moving punch, which consists of a steel implement made to fit the washer-hole in the die-bed, and provided with a central bore adapted to take the upper end of the center punch and leads to an opening, 42, in the punch-stock, through which the center clippings from the washers eventually find escape.

H designates a number of washers cut and in progress through the machine, and in their movements and relation to the parts sustaining the center punch in vertical position.

It will be perceived from the foregoing description of the parts and their functional relations that the center punch is held in place in true central relation by the washers that are punched. Each washer as it is made is pushed down into the die over the center punch, so that the next washer cut occupies the space above or on top of the mass of washers which fill the die, and thus the center punch is held centered by the washers, and this center maintained and tested by the upper end of the center punch entering the hole in the moving punch, and by the lower end of the pin setting at each stroke on the end of the center pin in the bed-piece.

The operation is as follows: Two washers or nuts, of the size desired and according to the capacity of the die and punch, are punched by hand or prepared by a lathe, and these are forced over the center punch, one being arranged at the lower part and the other at the upper part thereof. The center punch, with these arranged washers on it, is then adjusted in the die in proper position. These arranged washers hold the center punch in the die in position for operation. The machine is now ready for punching washers from a bar or plate, and by its stroke cuts and punches a washer from the plate or bar and forces the severed washer down over the center punch in the die, so that a space is left for the next washer to be cut. The successive washers are then punched from the bar fed to the machine and forced down over the center punch, which is held true to the center by the washers. As soon as the die is full of washers, one is discharged for every one cut, the discharged washer falling on the carrying-belt, which carries it to the place of delivery.

A thick washer or nut cut on the same machine need not be forced down on the center punch its full thickness; but the stroke of the punch should be low enough to move the center punch in its matrix for about one-eighth of an inch, so as to take the next cut freely. To cut heavier nuts, the machine must have a longer stroke than for lighter and thinner washers, and the die-bed must follow the stroke back accordingly to give room between the beds to let the nuts out.

The machine may be constructed with two or more punches and center punches, and thus more than one washer cut at single stroke on one punch.

Washers cut by my improved mechanism are entirely free from feather-edges, the metal being compressed in the course of the washer's progress through the die, being discharged with clean edges and smooth faces.

In Fig. 7 of the drawings, the centering-punch is shown as having a central bore and the centering-pin having a central channel to convey a cooling-liquid. This construction is adapted to making hot washers, and serves to keep the die and punch cool. When cold washers are made, the centering-punch is made solid, as shown in the drawings.

So far as I am aware, washer-punching machines as heretofore designed and constructed cut the washers into a die which is provided with a means operating as a counter-force to push the cut washers out of the die from the mouth or entrance to the die at which they are cut. This back discharge defaces and feather-edges the cut washer and injures the cutting-edge of the die. By discharging the washers in the direction of the cut they are made smooth and finished and the cutting-edge of the die preserved unimpaired much longer than by a reverse discharge. The series or pile of washers as they are packed in the die are held therein by the strong frictional contact sufficiently rigid to permit the next one to be cut without the interposition of, and absolute necessity of, the centering-pin below, which is interposed for convenience and to give additional security to the certainty of the centering-punch being centered when the operation of cutting is being initiated, since after the die is filled with the washers the centering-punch is held true to the center by the impacted washers in the die and so maintained and supported as to be in operative relation to the moving punch and effectually perform the purposes intended.

What I claim is—

1. The combination of the punch, the die, the center punch, and the centering-pin, substantially as described.

2. The combination of the punch, the spring-supported die-bed, the die, the center punch, and the centering-pin, substantially as described.

3. The combination of the bed-piece with seats to receive springs, and the walls of which seats constitute guiding-surfaces for the die-bed and provided with an adjustable centering-pin, elastic cushions arranged in said seats, the die-bed having guide-flanges to engage the sides of the seats on the bed-piece, a die arranged in the die-bed, the center punch, and the punch, substantially as described.

4. The combination, with the punch, the die, and the centering-pin having a convex upper end, of the center punch formed with a tapering lower end and concaved bottom, substantially as described, and for the purpose stated.

5. The combination, with the punch, of the die formed with a flaring lower portion, the center punch having a tapering lower end, and the centering-pin, substantially as described.

6. The combination, with the punch, the die, and the center punch, of the carrying-belts arranged to receive and carry the discharged washers from the die, substantially as described.

7. The combination, with the bed-piece formed with belt-channels in its upper face and the die, of the carrying-belts arranged to travel in the channels of the bed-piece and receive the discharged washers from the die, substantially as described.

8. In combination, a die filled with washers, a center punch held in cutting position by the impacted washers in the die, and a movable punch to cut and push the washers through the die and off the center punch in the direction of the cutting stroke of the moving punch, substantially as described.

9. A moving or cutting punch, in combination with a die filled with washers, and a center punch supported by the washers in the die, whereby the descent of every washer cut by the punch discharges a washer at the opposite end of the die, substantially as specified.

10. The combination, with the spring-supported die-bed and die arranged therein, of a center punch held in the die by the washers impacted therein, and a reciprocating punch to cut the washers and press them through the die at the opposite end from their entrance thereto, substantially as specified.

11. The combination, with the die-bed and center punch arranged therein and supported by a series of cut washers in the die, of the center-punch pin formed with a central bore, substantially as described, and for the purpose specified.

12. The combination, with the die-bed, of a center punch formed with a central bore extending partially through it, and the centering-punch pin formed with a center bore, substantially as described, and for the purpose specified.

In witness whereof I have hereunto set my hand in the presence of two attesting witnesses.

SAMUEL J. SHIMER.

Attest:
M. F. NORACONK,
EDWARD P. HILL.